Dec. 4, 1962          G. C. SAWYER          3,066,877

SHREDDER OF ROTATING WIRES FOR FILTER CAKE

Filed Dec. 12, 1960          2 Sheets-Sheet 1

INVENTOR.
GEORGE CLARK SAWYER
BY
ATTORNEY.

Dec. 4, 1962 G. C. SAWYER 3,066,877
SHREDDER OF ROTATING WIRES FOR FILTER CAKE
Filed Dec. 12, 1960 2 Sheets-Sheet 2

INVENTOR.
GEORGE CLARK SAWYER
BY
Samuel Branch Walker
ATTORNEY

3,066,877
SHREDDER OF ROTATING WIRES FOR FILTER CAKE

George Clark Sawyer, New City, N.Y., assignor to American Cyanamid Company, New York, N.Y., a corporation of Maine
Filed Dec. 12, 1960, Ser. No. 75,167
2 Claims. (Cl. 241—191)

This invention relates to an apparatus for shredding a filter cake comprising at least two plates between which wires run and which plates are rotated around an axis so that the filter cake is shredded by impact with the rapidly moving wires.

In the chemical industries, solids are separated from liquids by filtration. Particularly in fermentation of antibiotics and other therapeutic products, it is desirable to filter mycelia and other materials from a filter broth using a drum-type filter. In such a filter, the drum is usually coated with a layer of a filter aid, and after the filter drum is sufficiently coated with a thick layer of filter aid, the drum is rotated while drawing the broth by vacuum through the thick filter cake. A knife blade is used to cut off a thin layer of the filter cake with the filtered solids, which gives a fresh filtering surface free from blinding. This cake, as trimmed off by the doctor knife, is then dried for subsequent processing. In some instances, the dry material has no substantial value and is discarded. In other instances, it may be extracted, or used directly as a component for animal feeds. Similar problems arise when the filter cake resulting from an earlier step is treated with an organic solvent and the cake solvent extracted, either directly or by an azeotropic extraction process.

The wet filter cake has usually been fed to a drier where it is dried by warm gases. One such process for drying is described in United States Patent 2,746,168, to C. A. Rickabaugh, Continuous Drying Apparatus, May 22, 1956.

Such a filter cake is usually so wet with either water or a solvent that it is thixatropic. That is, it appears solid while standing, but if worked mechanically, or shaken or shredded and cut by conventional means, the cake becomes liquid. There are a number of products which have the property of appearing solid, but when worked become gooey. Certain clays and muds look solid, and if stepped on, water can be seen to be squeezed out. However, this same material, if patted with the hand or foot, after a few minutes becomes a thick, fluid mud. Similarly, the thixatropic filter cakes appear solid, and if dried remain a porous solid. If mechanically worked, the filter cake turns to a sticky, muddy mass, which will not feed properly through a drier, and which tends to gum up equipment.

It has now been found that this thick filter cake, as a sheet, coming from the drum filter, may be broken into shreds which are conveniently handled by a multiple plate type drier, by passing the filter cake as it comes off the filter itself through a rotating wire shredder in which a plurality of wires are moved sufficiently rapidly to fracture the filter cake into shreds by impact, and the shreds are torn off in a size suitable for use in a drier, but without being worked sufficiently to cause them to become gummy or gooey.

Conveniently, a balanced number of wires, two or four to eight, are stretched between two plates attached to a shaft, and the shaft is driven at a fairly high speed, so that the filter cake can be dropped through the rotating wires, and be shredded. It is preferred that the shaft and the wires be approximately horizontal, and stretched just below the apron of the filter drum, so that as the cake comes off the apron, it is shredded. Even if the cake breaks in irregular, loose patterns as it falls by gravity from the apron, it is still shredded in proper form. Where a close spacing to the apron is used, centrifugal force has a tendency to throw the wires out so that they assume a barrel shape, and drag on the apron. This can be prevented by displacing the two plates angularly so that the wires are stretched at an angle to the shaft. For example, if stretched at an angle to the shaft of about 40° between the two ends, the center portion, when the wires are at rest, will describe a smaller diameter than the ends. The rotating wires describe a path mathematically classified as a hyperboloid of revolution, by definition.

As the rotational speed of the shaft, plates and wires is increased, the wires are thrown out by centrifugal force. By having uniform tension on the wires, centrifugal force throws all of the wires out evenly, and if properly tensioned, will throw out the center of the wires so that they are describing a path of the same diameter as the same wires at the end, and the path described by the wires is essentially a right circular cylinder, even though when at rest the wires form the above-mentioned hyperboloid of revolution.

Because the wires are very flexible and under the influence of centrifugal force can be caused to change their shape by slight additional weight, any portions of filter cake which might stick to any wire cause that wire to flex, and in its flexing and changing of its rotational path, the wire tends to shake off the portion of the cake. In operation, the flexing of the wires is so slight and the efficacy in shaking off particles of the cake is so great that the wires appear to be rotating through a fixed path without the cake in any way adhering to the wires. The problem of adherence of the cake to shredder mechanisms has caused many complications in the past.

Two embodiments of the present invention are shown in the accompanying drawings in which.

Figure 1:
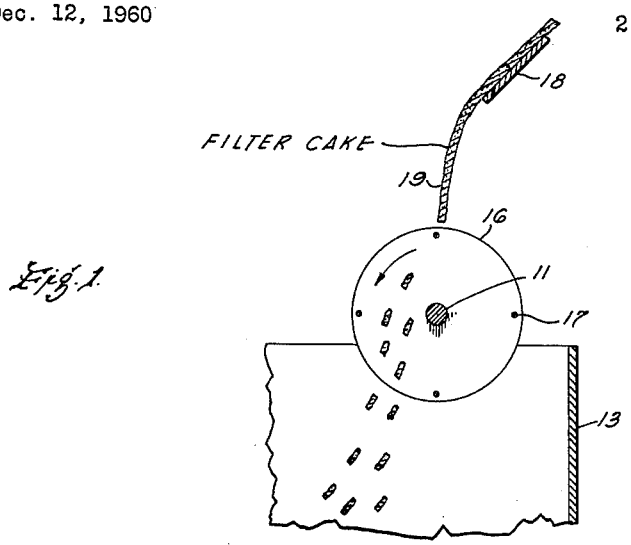
FIGURE 1 is an axial section through the wire cage showing the filter cake being shredded.
Figure 2:
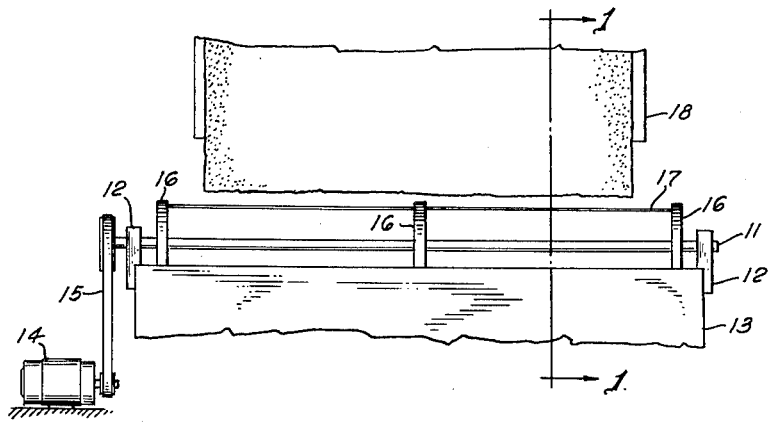
FIGURE 2 is a front view of the same shredder.

The shredder shaft 11 is mounted in shaft journal brackets 12 attached to a dryer feed hopper 13. The shredder shaft is rotated by a motor 14 operating through a V belt drive 15. Mounted on the shredder shaft are three wire support plates 16. Attached to and supported by these wire support plates are the shredding wires 17. The wires may be attached in the plates by set screws acting through holes in the plates. As shown in FIGURE 1, four wires are used. It is preferred that the number of wires be even so that each wire is balanced by one on the other side. Two, four, six or eight work very well, and more can be used. Four are shown. Above the hopper is an apron 18, on a drum filter. In accordance with conventional practice, a doctor knife cuts a thin sheet of filter cake from the surface of the filter drum, which cake slides down over the apron.

In use, the cake is frequently sufficiently adherent that it sticks together until its lower end touches the rotating wires. In some instances, the cake breaks off in sheets and the irregular sheets fall down through the rotating wires. In a typical installation, piano wire mounted between 8-inch diameter disks supported four feet apart on a 1-inch shaft and driven at 800 revolutions per minute gave a very good shredding effect.

Conveniently, but not necessarily, a shield may be placed over the rotating wires to prevent particles of the filter cake from being thrown out, and to protect operators from inadvertent contact with the disks and wires. Such a screen is not necessary, and is not shown in the drawings, as it would unduly block the view of the operating mechanisms. Safety shields are conventional for all moving parts.

If a safety shield is used, an air blast through the shredder is advantageous, as the shredded particles dry slightly on the surface as they fall, which aids in preventing the shreds from adhering to each other.

The shredder, in working with a wet filter cake, from a typical Streptomycetes fermentation, broke the wet cake into shreds which were readily dried in a mechanical dryer consisting of a series of plates with scrapers scraping the material from each plate around the plate to a gap where it was dropped to the next plate. At the apron, the cake appeared dry, but when mechanically worked, as for example by crushing it between the fingers, turned into a gum or slime which was very sticky, and adhered to anything it contacted. Because of the flexibility of the rotating wires, it was found that any particle of the cake which once tended to adhere to a wire was thrown off as the wire flexed during rotation.

Figure 3:
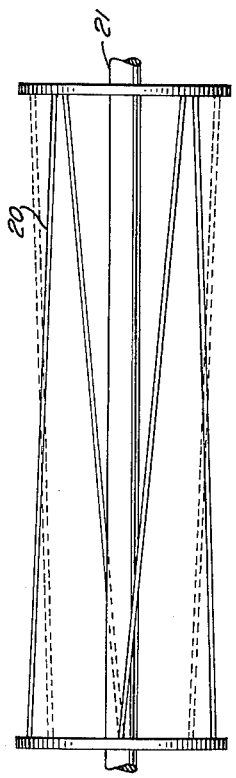
FIGURE 3 is a front view of a shredder in which the individual wires are at an angle with the shaft.
Figure 5:
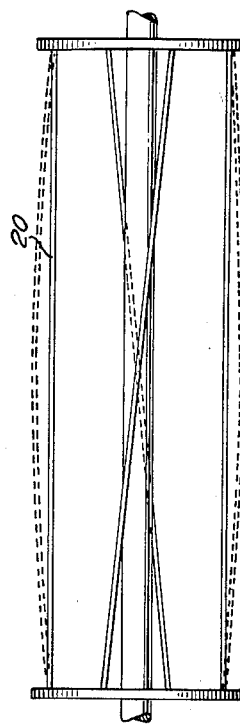
FIGURE 5 is the shredder of FIGURE 3 in a slightly rotated position.
Figure 4:
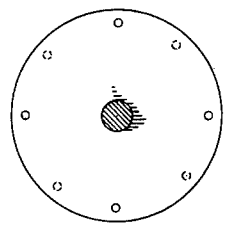
FIGURE 4 is an end view of the shredder of FIGURE 3.

In the embodiments shown in FIGURE 3, the wires are non-axial. The end plates are rotated through an angle of about 40°. This causes the wire 20 to assume a slanted appearance, and in fact the wires form generating elements on the surface of a hyperboloid of revolution. When rotated slowly, the wires describe a smaller diameter path in the middle than at the ends. The wires are shown in one position in FIGURE 3. Dotted lines show the position that the wires assume as the other end of the wire passes above the shredder shaft 21. When rotated rapidly, the wires are thrown out by centrifugal force, and each assumes a curved configuration as shown in FIGURE 5. The dotted lines show the position to which the wires 20 are thrown by centrifugal force. FIGURE 5 is a view rotated 20° from the view of FIGURE 3.

By driving the wires at such a speed that the effect of centrifugal force is just sufficient to compensate for the slimming action due to the warped arrangement of the wires, the wires in effect assume essentially a cylindrical configuration.

A cylindrical configuration of the driven wires is convenient because the rotating wires may then be placed closer to the apron of the drum dryer whereby a more uniform shredding effect is obtained as at that point the velocity of the filter cake, whether adherent and fed at the rate at which it is cut off with the knife, or whether it breaks from the knife and slides over the apron, is more nearly the same, and thus the shredding action gives a more uniform size and shape.

For various modifications, the tension in the wire, the speed of the wires, and the distance between them, may be modified to fit a particular filter cake. The plates need not be at right angles to the shaft, and if suitably journaled for axial loads, the center portion of the shaft may be omitted. The end plates may merely be stars or cross arms that support the wires as the plates act only as a wire support. These and other obvious modifications will suggest themselves to those skilled in the art.

Having illustrated the same as my invention, I claim:

1. An apparatus for shredding a filter cake comprising a shaft, journal means for said shaft, two spaced apart, substantially parallel plates on said shaft, at least two flexible wires stretched between said plates, and at an acute angle with, but not intersecting, the longitudinal axis of the shaft, whereby said wires, when slowly rotated generate a hyperboloid of revolution, means to feed a filter cake into the path of the rotating wires, means to receive the cake shreds resulting from the action of the rotating wires on the filter cake, and drive means to rotate said shaft about its longitudinal axis at such a speed that centrifugal force bends the wires out to cause the pattern of the wires to approximate a circular cylinder.

2. An apparatus for shredding a filter cake comprising a shaft, journal means for said shaft, two spaced apart, substantially parallel plates on said shaft, at least two flexible wires stretched between said plates, and at an acute angle with, but not intersecting, the longitudinal axis of the shaft, whereby said wires, when slowly rotated, generate a hyperboloid of revolution, means to feed a filter cake into the path of the rotating wires, means to receive the cake shreds resulting from the action of the rotating wires on the filter cake, and drive means to rotate said shaft about its longitudinal axis at such a rate that centrifugal force causes said wires to flex to generate an essentially cylindrical rotational surface.

References Cited in the file of this patent

UNITED STATES PATENTS

| | | |
|---|---|---|
| 1,193,176 | Moore | Aug. 1, 1916 |
| 2,095,385 | Heisserman | Oct. 12, 1937 |
| 2,171,296 | Youngman et al. | Aug. 29, 1939 |
| 2,403,638 | Clark | July 9, 1946 |
| 2,517,903 | Luhrmann | Aug. 8, 1950 |
| 2,628,036 | Hall | Feb. 10, 1953 |
| 2,866,604 | Hall | Dec. 30, 1958 |
| 2,879,904 | Walsh et al. | Mar. 31, 1959 |
| 2,979,879 | Reynolds et al. | Apr. 18, 1961 |